United States Patent
Alfredsson

[11] Patent Number: 5,388,472
[45] Date of Patent: Feb. 14, 1995

[54] MOTOR VEHICLE GEARBOX

[75] Inventor: Sverker Alfredsson, Västra Frölunda, Sweden

[73] Assignee: AB Volvo, Goteborg, Sweden

[21] Appl. No.: 50,142

[22] PCT Filed: Nov. 1, 1991

[86] PCT No.: PCT/SE91/00740

§ 371 Date: Jul. 2, 1993

§ 102(e) Date: Jul. 2, 1993

[87] PCT Pub. No.: WO92/08067

PCT Pub. Date: May 14, 1992

[30] Foreign Application Priority Data

Nov. 1, 1990 [SE] Sweden .............. 9003488-5

[51] Int. Cl.[6] ............................................. F16H 3/04
[52] U.S. Cl. ..................................................... 74/331
[58] Field of Search ..................................... 74/331

[56] References Cited

U.S. PATENT DOCUMENTS

| | | |
|---|---|---|
| 4,685,343 | 8/1987 | Ehrlinger et al. ............ 74/331 X |
| 4,727,764 | 3/1988 | Klaue . |
| 4,831,894 | 5/1989 | Braun .............................. 74/331 X |
| 5,079,965 | 1/1992 | Leber et al. ..................... 74/331 X |
| 5,239,887 | 8/1993 | Muller et al. ................... 74/331 X |

FOREIGN PATENT DOCUMENTS 02789938 8/1988 European Pat. Off. .

*Primary Examiner*—Rodney H. Bonck
*Assistant Examiner*—Daniel Wittels
*Attorney, Agent, or Firm*—Young & Thompson

[57] ABSTRACT

Power shift motor vehicle gearbox with an input shaft (1), two counter-shafts (2, 3) and a central synchronizer (30). The input shaft has a gear wheel (5) in engagement with a gear wheel (6) freely rotatably mounted on one counter-shaft (2) and lockable by a friction clutch (7) to the shaft. The gear wheels form a pair for driving the counter-shaft. The input shaft also has a freely rotatably mounted gear wheel (8) which can be locked by a friction clutch (10) to the shaft. The gear wheel (8) engages a gear wheel (9) on the other counter-shaft (3) for driving the same when the clutch is engaged.

3 Claims, 2 Drawing Sheets

MOTOR VEHICLE GEARBOX

FIELD OF THE INVENTION

The present invention relates to a motor vehicle gearbox with an input shaft, a pair of counter-shafts, an output shaft and pairwise cooperating gear wheels on the input and counter-shafts and on the output and counter-shafts, at least one gear wheel in each pair of cooperating gear wheels being rotatably mounted and lockable on its shaft by means of engaging clutch means, the clutch means for locking cooperating gear wheels on the input and counter-shafts being friction clutches, the counter-shafts being coordinated with synchronizing means independent of the clutch means, by means of which synchronizing means the respective counter-shaft can be accelerated up to a certain engine speed determined by the selected gear.

BACKGROUND OF THE INVENTION

Double counter-shafts are used, on the one hand, in gearboxes in which it is desired, with a given length of gearbox, to obtain more gear ratios than what is practically possible in a conventional gearbox design with one counter-shaft, and, on the other hand, in so-called powershift gearboxes, i.e. gearboxes with double clutches, each cooperating with an individual counter-shaft. In such gearboxes the gear speeds are preselected and shifting is thereafter effected by disengaging one clutch and engaging the other clutch.

Various solutions are known for achieving a compact gearbox design of the powershift type with a large number of gear ratios. In one type which is known by SE 8700583-1 (corresponding to US-A-4,876,907) two concentric input shafts are used driving individual counter-shafts which can be engaged alternately with the aid of a pair of multiple disc clutches arranged in series outside the gearbox. Synchronization is achieved with the aid of a central synchronizing clutch on one of the counter-shafts. In another gearbox type with double counter-shafts, which is known by e.g. GB-A-2,110,324, a single input shaft drives simultaneously two gear wheels which, via individual clutches arranged inside the housing on the respective counter-shafts, can be locked to its shaft and establish a drive train between the input shaft and the output shaft via either counter-shaft. The synchronization is achieved with the aid of a two-part synchronizing device, which in this version is formed by a synchronizing clutch on either counter-shaft. In this gearbox, the torque is transmitted from the input shaft to the output shaft in all gear ratios Via a counter-shaft. The gearbox thus has no direct drive gear ratio.

OBJECT OF THE INVENTION

The purpose of the present invention is to provide a gearbox of the type described by way of introduction which combines the advantages of the known gearboxes as described above at the same time as individual disadvantages, such as excessive design length, due to placing the clutches in series outside the gearbox housing as compared to beside each other inside the housing, and the lack of a direct drive gear, are eliminated.

SUMMARY OF THE INVENTION

This is achieved according to the invention by virtue of the fact that the input shaft has a gear wheel rotatably mounted thereon, which engages a gear wheel on one of the counter-shafts and is lockable, on the one hand, by means of one of said friction clutches, to said input shaft and, on the other hand, relative to the output shaft by means of one of the other engaging clutch means. The gearbox according to the invention uses a single input shaft and friction clutches arranged in the housing on individual shafts, which provides a simple mounting of the input shaft and a short length of the transmission as a whole. By arranging these clutches on one of the counter-shafts and on the input shaft instead of on both counter-shafts, and also mounting a gear wheel which can be locked relative to the output shaft with the aid of a common engaging sleeve and relative to the input shaft with the aid of one of the friction clutches, there is obtained both direct drive in the highest gear speed and powershift into the highest gear.

BRIEF DESCRIPTION OF THE DRAWINGS

The invention will be described in more detail with reference to an embodiment shown in the accompanying drawings, where FIGS. 1 and 2 are two identical Figures of a schematically represented gearbox with drive trains for the various gear ratios drawn in.

DETAILED DESCRIPTION OF THE INVENTION

Figure 1:
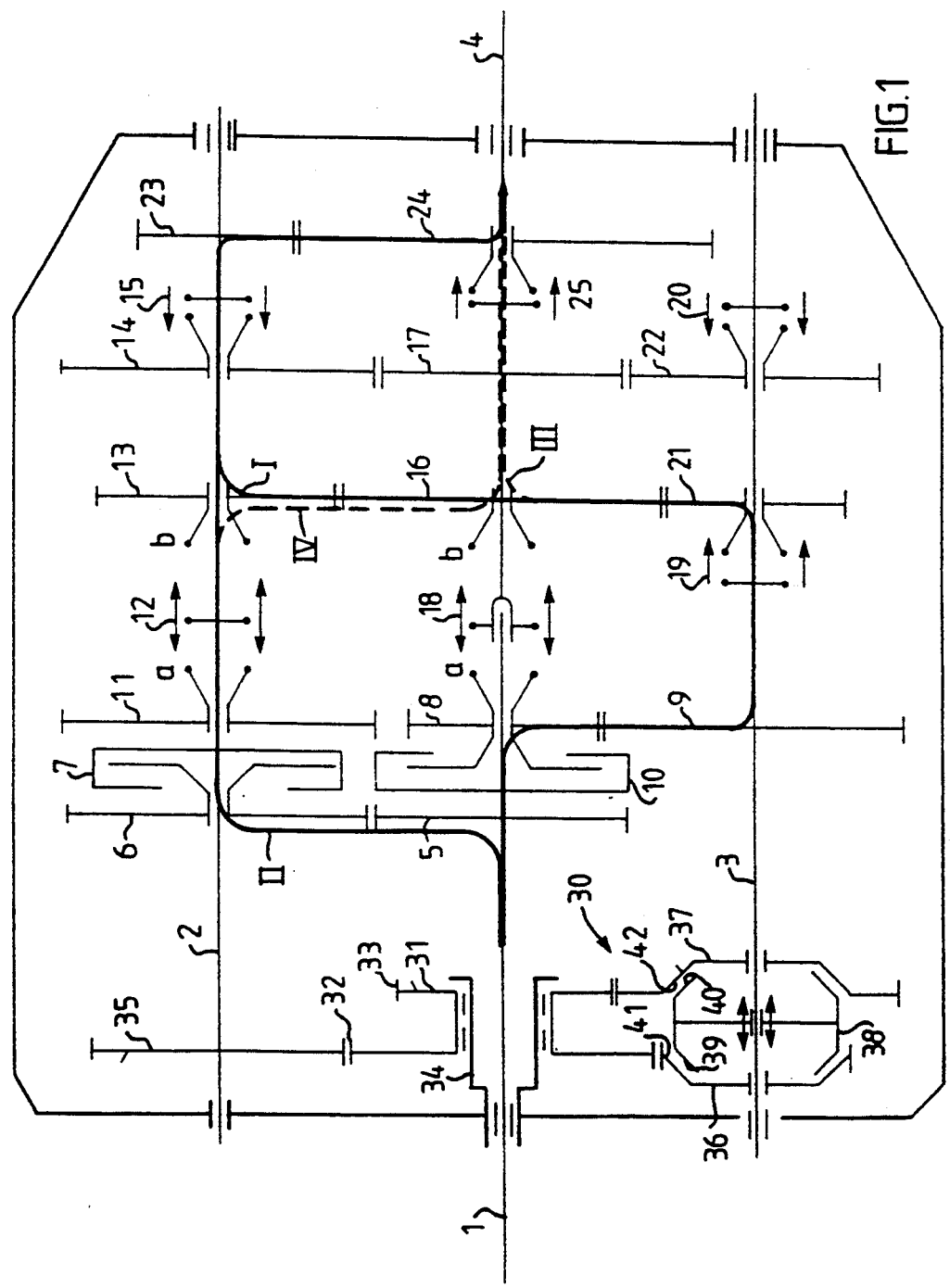

In FIG. 1, 1 designates an input shaft, 2 a first counter-shaft, 3 a second counter-shaft and 4 an output shaft. The input shaft 1 has a first gear wheel 5 solidly joined to the shaft, said gear wheel 5 engaging a gear wheel 6 on the first counter-shaft 2. Gear wheel 6 is freely rotatably mounted on its shaft 2 and can be locked to the shaft with the aid of a friction clutch 7, which is preferably a multiple disc wet clutch. The input shaft 1 also has a second freely rotatably mounted gear wheel 8, which engages a gear wheel 9 non-rotatably fixed on the other counter-shaft. The gear wheel 8 can be locked to the shaft 1 with the aid of a second friction clutch 10, which is preferably a multiple disc wet clutch.

Gear wheels 5, 6 and 8, 9, respectively, thus form gear wheel pairs for driving the respective counter-shafts, where one gear wheel 6 or 8, respectively, can be released. By engaging and releasing the respective clutches 7, 10, the counter-shafts 2, 3 can be alternatively driven by the input shaft 1.

On the first counter-shaft 2, a reversing gear wheel 11 is freely rotatably mounted and can be locked on the shaft by an axially displaceable engaging sleeve 12. The shafts are disposed in a V-shape so that the gear wheel 11 is in engagement with gear wheel 9 on the other counter-shaft 3. Counter-shaft 2 has two additional gear wheels 13 and 14, which are freely rotatably mounted on the shaft. Gear wheel 13 can be locked to the shaft 2 by engaging sleeve 12, and gear wheel 14 can be locked to the shaft by an additional engaging sleeve 15. Gear wheel 13 engages gear wheel 16 on the output shaft 4 and gear wheel 14 engages gear wheel 17 on the output shaft 4. Gear wheel 16 can be locked to the shaft 4 by means of an engaging sleeve 18 and gear wheel 17 is non-rotatably fixed on the shaft. A pair of freely rotatably mounted gear wheels 21 and 22, respectively, which can be locked by engaging sleeves 19, 20, engage gear wheels 16 and 17, respectively, on the output shaft. Finally, the first counter-shaft 2 has a gear wheel 23 non-rotatably joined to the shaft, which gear wheel engages a gear wheel 24 freely rotatably mounted on the output shaft 4, said gear wheel 24 being lockable to the shaft by an engaging sleeve 25.

With the shaft and gear wheel combination described, six gear ratios forward and one gear ratio in reverse are obtained (the shafts are arranged in a V-shape to make possible engagement between gear wheels 9 and 11). By arranging the sleeve 18 which is non-rotatably but axially displaceably mounted on the output shaft so that it also can be used to lock the gear wheel 8 relative to the output shaft, a seventh direct gear ratio can be obtained, as will be described below.

All of the engaging sleeves 12, 15, 18, 19, 20 and 25 described above lack conventional individual synchronizing devices and can consist of axially displaceable splined sleeves. The sleeve 12 has a forward locking position "a", in which it locks the gear wheel 11, and a rear locking position "b", in which it locks the gear wheel 13. The sleeve 18 has corresponding forward and rear locking positions "a" and "b", in which it locks the gear wheel 8 and the gear wheel 16, respectively, in relation to the output shaft. The other engaging sleeves have only one locking position as is revealed in the Figure.

The actual synchronization is carried out by a central synchronizing device with the general designation 30, the functional principle of which is known by the above mentioned SE-A 8700583-1 (corresponding to US-A 4,876,907). The synchronizing device 30 comprises a running wheel 31 with two gear rings 32 and 33 and is freely rotatably mounted on a sleeve 34 arranged concentrically with the input shaft 1. One gear ring 32 of the running wheel 31 is engaged with a drive gear wheel 35 non-rotatably fixed on the first counter-shaft 2. Each of the gear rings 32, 33 is also in engagement with an individual gear wheel 36 and 37, respectively, freely rotatably mounted on the second counter-shaft 3. The gear wheels 36 and 37 are alternatively lockable to the shaft 3 by means of an intermediate cone clutch 38, the frictional surfaces 39 and 40 of which can be brought into engagement with conical frictional surfaces 41 and 42, respectively, on the gear wheels.

Figure 2:
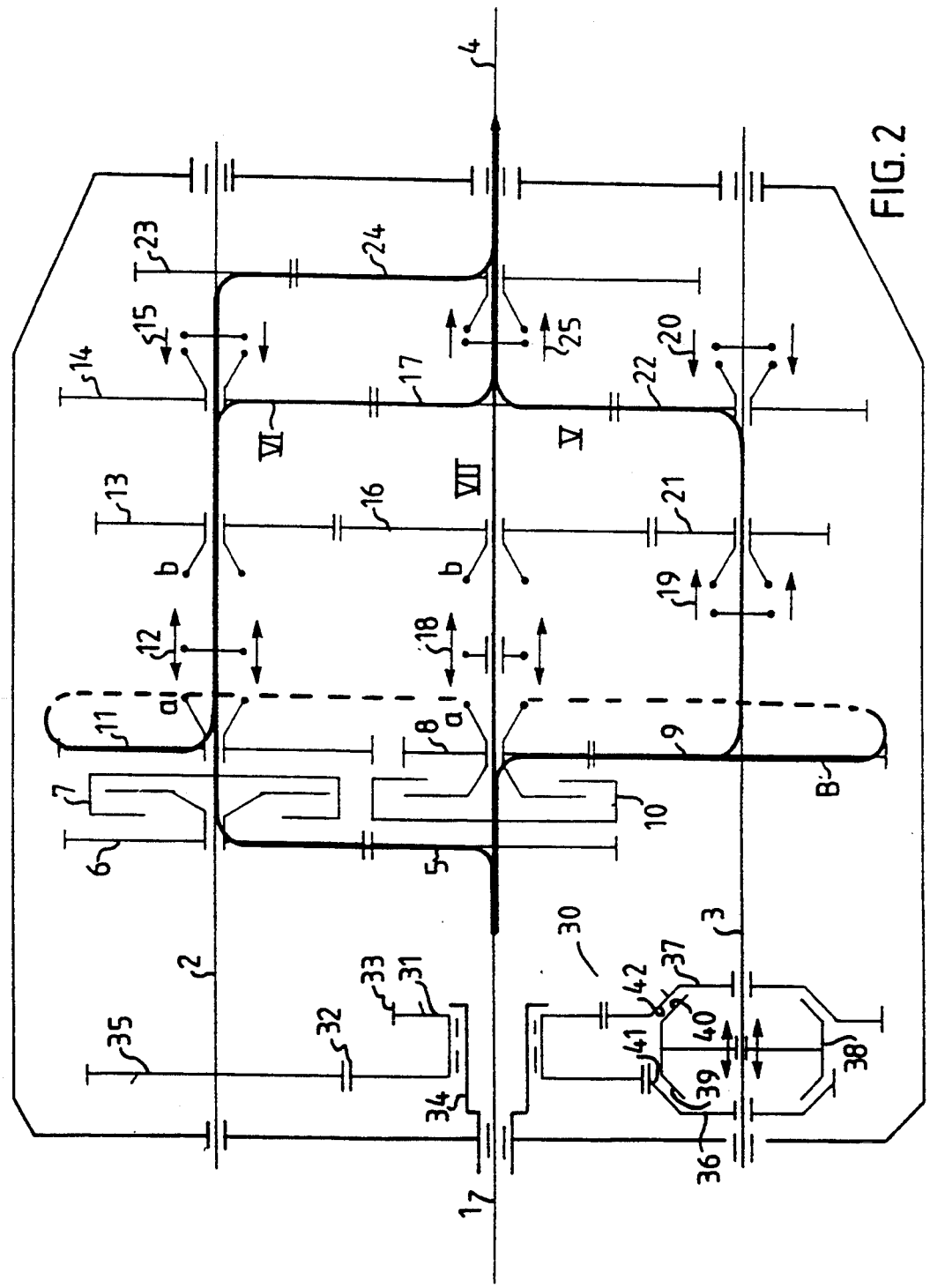

FIG. 1 shows the torque transmission train from the input shaft to the output shaft in the first, second, third and fourth gear speeds, while the torque transmission train for the fifth, sixth and seventh gear speeds as well as reverse is shown in FIG. 2. Starting from the neutral position, in which both clutches 7, 10 are released, engagement of the first gear speed is prepared by displacing the engaging sleeve 12 to the locking position "b" and the engaging sleeves 25 and 19 are displaced to their respective locking positions. The actual engagement of the first gear speed is achieved by engaging the clutch 10. The torque is now transmitted, as indicated by the solid line labelled I in FIG. 1, via the gear wheel pair 8, 9, the three gear wheels 21, 16 and 13 and finally the gear wheel pair 23, 24 to the output shaft 4. By utilizing the two intermediate shafts for torque transmission via an intermediate gear wheel 16, an exceptionally large gear ratio can be obtained in the lowest gear.

Shifting to the second gear speed is then carried out by releasing the clutch 10 and engaging the clutch 7. For this shifting operation no synchronization work is required since none of the engaging sleeves need to be brought into new engagement. When driving in the second gear speed, the torque is transmitted via the gear wheel pairs 5, 6 and 23, 24.

In third gear, there is a torque transmission via the gear wheels 8, 9, 21 and 16, which means that the gear wheel 13 must be released and that the gear wheel 16 must be locked to the output shaft. In order to be able to move the engaging sleeve 18 to its locked position "b", thus locking the gear wheel 16, the gear wheel must be accelerated up to at least essentially the same r.p.m. as the output shaft 4. This is achieved with the aid of the central synchronizing device 30 by bringing its clutch surface 38 into engagement with the frictional surface 40 of the gear wheel 37. This accelerates the counter-shaft 3 up to a rotational speed which results in the gear wheel 21 accelerating the gear wheel 16 up to the rotational speed of the output shaft or to a rotational speed in the vicinity of the rotational speed of the output shaft. The gear wheel 16 can now be locked by the engaging sleeve 18, whereafter the shifting itself is effected by releasing the clutch 7 and engaging the clutch 10.

In the fourth gear speed, torque is transmitted via gear wheels 5, 6, 13 and 16, which means that when shifting from third to fourth gear speed, the engaging sleeve 25 must first be released and the engaging sleeve 12 must be moved to its locked position "b" to lock the gear wheel 13 to the counter-shaft 2. In order to synchronize the rotational speed of the counter-shaft 2 with the rotational speed of the gear 13, the clutch cone 38 is moved to engagement with the synchronizing gear ring 36 so that it accelerates, via the gear ring 32, the speed of the counter-shaft 2 to at least almost the same speed as the gear wheel 13. After synchronization and locking of the gear wheel 13, the actual shifting is effected by releasing the clutch 10 and engaging the clutch 7.

Shifting from fourth gear speed to fifth gear speed and from fifth gear speed to sixth gear speed is effected by alternating synchronization via the synchronization gear rings 37 and 36, locking the gear wheels in question with the associated engaging sleeves and alternating engagement of the respective clutches 7 and 10 in the same manner as has been described above.

In the sixth gear speed, the clutch 7 is engaged and torque is transmitted via gear wheels 5, 6, 14 and 17. Shifting into the seventh gear speed (direct driving) is effected by engaging the synchronizing gear ring 37, whereupon the counter-shaft 3 via the gear wheel 9 accelerates the gear wheel 8 at least up to a speed approaching the speed of the output shaft 4. Thereafter gear wheel 8 is engaged by moving the engaging sleeve 18 to the locking position "a". The gear wheel 8 is now locked to the output shaft 4 and engagement of the direct drive is effected by releasing the clutch 7 and engaging the clutch 10, so that the input and output shafts 1, 4 are locked together as a unit.

In reverse (see FIG. 2), torque is transmitted via gear wheel pairs 9, 11 and 23, 24. Engagement is effected by moving the engaging sleeve 25 to its locking position and by moving the engaging sleeve 12 to its locking position "a", whereafter the clutch 10 is engaged. Rocking the vehicle, if it has become stuck for example, can be done simply by shifting between engagement of clutches 7 and 10, thereby effecting a shifting between reverse and the second gear speed.

It is claimed:

1. Motor vehicle gearbox comprising: a housing with an input shaft, a first counter-shaft, a second counter-shaft, an output shaft and pairwise cooperating gear wheels on the input shaft and said first counter-shaft, and on the output shaft and said second counter-shaft, at least one gear wheel in each pair of cooperating gear wheels being rotatably mounted and lockable on its shaft by clutch means, the clutch means for locking cooperating gear wheels on the input shaft and first counter-shaft being friction clutches, said counter-shafts being coordinated with synchronizing means independent of the clutch means, said synchronizing means adapted to accelerate a respective counter-shaft up to a certain engine speed determined by a selected gear, said input shaft having a first gear wheel rotatably mounted thereon, which engages a second gear wheel on one of the counter-shafts and is lockable relative to said input shaft by one of said friction clutches, and is lockable relative to the output shaft by an engaging sleeve.

2. Gearbox according to claim 1, further comprising a running wheel with two gear rings freely rotatably mounted concentric to the input shaft, one of said gear rings engaging a gear wheel on the first counter-shaft, said gear rings engaging on the second counter-shaft individual freely rotatably mounted gear wheels, which are alternatively lockable on said second counter-shaft by means of a friction clutch to provide a torque transmission from one counter-shaft to the other via the running wheel.

3. Gearbox according to claim 1, further comprising rotatably mounted on the output shaft a gear wheel which engages a gear wheel on each counter-shaft and is disposed to transmit torque from one counter-shaft to the other in order to provide the greatest gear ratio between the input and output shafts.

* * * * *